United States Patent Office 3,201,343
Patented Aug. 17, 1965

3,201,343
DESICCANT MANUFACTURE AND THE USE OF SUCH DESICCANTS IN THE CONVERSION OF HYDROCARBONS
Edward J. Bicek, La Grange, Ill., assignor to Universal Oil Products Company, Des Plaines, Ill., a corporation of Delaware
No Drawing. Filed Apr. 1, 1963, Ser. No. 269,696
15 Claims. (Cl. 208—95)

This application is a continuation-in-part of my copending application, Serial Number 153,686, filed November 20, 1961, now abandoned.

The invention encompassed herein relates to the manufacture of an improved desiccant having selective absorbent propensities, and which is particularly adaptable for effecting the reduction of the water content of a stream being treated, without effecting the removal of a particularly desired sulfurous compound therefrom. Therefore, the desiccant, prepared in accordance with the method of the present invention, is especially advantageous in those processes in which an internally recycled gaseous stream must necessarily be substantially dry, while simultaneously having a particular hydrogen sulfide concentration.

A great majority of hydrocarbon conversion processes utilize either a catalytic composite in which the active metallic components exist, and must be maintained in, a sulfided state, or a reaction zone atmosphere in which a particular concentration of hydrogen sulfide is desired. Examples of such processes are the catalytic reforming of hydrocarbons, utilizing a catalyst comprising one or more of the platinum-group metals and/or compounds thereof; various hydrogenation and/or treating processes, utilizing catalysts generally consisting of sulfided metals from Group VI–A and the iron-group of the Periodic Table, and hydrocracking processes utilizing catalysts consisting of at least one metallic component from the metals and compounds of Groups VI–A and VIII of the Periodic Table. In these processes, the activity and stability of the catalytic composite is adversely affected by a temperature run-away at the outset of the process. That is, these processes tend to be at least slightly exothermic, and once initiated, are partially self-sustaining. A temperature run-away is often experienced at the outset of the process when hot hydrocarbon vapors initially contact the highly active, fresh catalyst, and to the extent that the catalytic composite becomes deactivated through the deposition of large quantities of coke and other carbonaceous material thereon, as a result of the excessive demethylation and hydrocracking being effected. It is well known, and the prior art discloses the advantages of employing either a catalytic composite in which the components exist in a sulfided state, or a particular concentration of hydrogen sulfide within the reaction zone, in order to eliminate the temperature run-away which might otherwise result. In those processes wherein a temperature run-away is not frequently encountered, for example a hydrorefining process operated at temperature generally far below the level at which excessive cracking reactions occur, it is generally conceded that the catalyst is most effective if maintained in the sulfided state.

Furthermore, while these catalysts must necessarily be maintained in a sulfided state or the reaction effected in an atmosphere containing hydrogen sulfide, the same must be accomplished under virtually absolutely "dry" conditions. That is, the presence of water within the reaction zone and/or in contact with the sulfided catalytic composite employed therein, effectively nullifies the benefits obtained from the sulfided catalyst or the hydrogen sulfide-containing reaction zone atmosphere, and to the extent that a temperature run-away, resulting in excessive demethylation and cracking reactions, may be experienced. Therefore, in hydrocarbon conversion processes of the foregoing type, wherein the total reaction zone effluent is separated into a normally liquid phase and a gaseous phase, the latter being recycled at least in part to combine with the material charged to the reaction zone, such recycle gaseous phase is treated with a suitable desiccant capable of reducing the water content thereof to a safe, operable level. However, even the more common desiccants, such as alumina, silica, calcium sulfate, and sodium and/or calcium aluminosilicate molecular sieves, possess an appreciable capacity for the absorption of hydrogen sulfide as well as water. This propensity is generally due either to the presence of minute quantities of alkaline impurities within the desiccant, or to the inherent adsorption capacity for hydrogen sulfide and/or mercaptans. Furthermore, the tendency of the desiccant to remove hydrogen sulfide is greatest at the outset of the operation, when fresh catalyst and a fresh desiccant are being employed; however, this is exactly the stage of the process at which the presence of hydrogen sulfide is most important.

The object of the present invention is to provide a desiccant for utilization in those hydrocarbon conversion processes in which a catalyst must be maintained in a sulfided condtion, or a particular hydrogen sulfide concentration maintained in the reaction zone atmosphere, and in the virtually complete absence of moisture.

Therefore, in a broad embodiment, the present invention relates to an improvement in a process wherein a catalyst is contacted with a substantially dry gas stream containing hydrogen sulfide, said gas stream having been treated with a desiccant to reduce the water content thereof, the desiccant also effecting the removal of hydrogen sulfided condition, or a particular hydrogen sulfide concensaid gas stream into contact with a pre-sulfided desiccant to reduce the water content of said gas stream without substantially removing hydrogen sulfide therefrom.

The present invention is more specifically directed toward an improvement in a hydrocarbon conversion process wherein a catalyst is contacted with a substantially dry hydrogen-rich gas stream containing hydrogen sulfide, said gas stream having been treated with a desiccant to reduce the water content thereof, the desiccant also effecting the removal of hydrogen sulfide therefrom which improvement comprises passing said gas stream into contact with a desiccant prepared by saturating said desiccant with hydrogen sulfide, whereby the water content of said gas stream is reduced without substantially removing hydrogen sulfide therefrom.

A more limited embodiment of the present invention provides an improvement in a hydrocarbon conversion process wherein a catalyst consisting of at least one metallic component selected from Groups VI–A and VIII of the Periodic Table is contacted with a substantially dry hydrogen-rich gas stream containing hydrogen sulfide, and wherein said gas stream is treated with a desiccant to reduce the water content thereof, the desiccant also effecting the removal of hydrogen sulfide therefrom, which improvement comprises passing said gas stream into contact with a desiccant prepared by saturating said desiccant with hydrogen sulfide, whereby the water content of said hydrogen-rich gas stream is reduced without substantially removing hydrogen sulfide therefrom.

From the foregoing embodiments, it is readily ascertained that the present invention encompasses a method of preparing a desiccant which is capable of reducing the water content of the material being treated thereby, without effecting the removal of hydrogen sulfide therefrom. In accordance with the method of the present invention, the desiccant, prior to use, is saturated with a sulfur-containing compound, such as hydrogen sulfide, tertiary butyl mercaptan, carbon disulfide, etc. The desiccant so treated is advantageously employed to dry a gas stream without removing hydrogen sulfide therefrom, and may also be utilized in the drying of liquid streams, such as hydrocarbon charge stocks to the foregoing processes, containing a desired quantity of a liquid sulfur-containing compound, such as tertiary butyl mercaptan. Other similar uses of the pre-sulfided desiccant of the present invention will be readily recognized by those possessing skill within the art.

Although the desiccant may be saturated with the sulfur-containing compound at atmospheric pressure or above, and at relatively low temperature within the range of from about 70° F. to about 200° F., it is preferred to saturate the desiccant at a temperature slightly above that at which the desiccant is to be used. For example, the recycled hydrogen-rich gas stream in a catalytic reforming process passes through the desiccant at about room temperature of about 80° to 100° F.; desiccant is, therefore, saturated with the sulfur-containing compound at a temperature of about 105° F., in order to saturate essentially all of the sulfur-containing capacity. Furthermore, where the sulfided desiccant is to be employed in regard to a hydrogen sulfide-containing stream, the sulfiding is effected with hydrogen sulfide; where the desiccant is to permit the flow of a stream containing a normally liquid sulfur compound such as tertiary butyl mercaptan, the sulfiding of the desiccant is effected with such tertiary butyl mercaptan. Depending upon the particular type of desiccant to be pre-sulfided prior to use, the time employed to sulfur-saturate the desiccant will be from about 2 to about 12 hours. The pre-sulfided desiccant may be then employed at the outset of an operation utilizing fresh catalyst without the danger of experiencing an unsuspected deficiency of sulfur within the reaction zone and/or on the catalyst.

As hereinbefore set forth, the pre-sulfided desiccant offers particular advantages when utilizing a catalytic composite comprising at least one metallic component selected from the metals of Groups VI-A and VIII of the Periodic Table, and the compounds thereof. In the present specification and the appended claims, the term "metallic component" is designated to mean those components of the catalyst which are employed for their catalytic activity, thereby distinguishing the same from those components of the catalyst normally utilized as the refractory inorganic oxide carrier material. Thus, the term "metallic component" includes chromium, molybdenum, tungsten, iron, ruthenium, osmium, cobalt, rhodium, iridium, nickel, palladium, platinum, mixtures of two or more, etc. Metallic components selected from this group are generally composited with a suitable refractory inorganic oxide serving as the carrier material therefor. Although the most common refractory material is alumina, other inorganic oxides are often utilized either alone or in conjunction therewith. Such other inorganic oxides include silica, boron oxide, hafnia, zirconia, titania, strontia, thoria, magnesia, etc. Catalytic composites prepared with one or more of the foregoing components are utilized in a wide variety of processes, which processes require the utilization of a desiccant to provide a substantially moisture-free reaction zone atmosphere, and further require the presence of particular quantities of hydrogen sulfide within the reaction zone, or the use of the catalytic composite having the metallic components existing in the sulfided state. One such process is catalytic reforming which utilizes a platinum-alumina catalyst which may or may not contain combined halogen from the group of fluorine and chlorine. In this process, a hydrocarbon charge stock is admixed with particular concentrations of a hydrogen-rich, internally recycled gas stream, the mixture being heated to the desired reaction temperature before being introduced into the reaction zone. The total product effluent from the reaction zone is passed into a suitable separation zone from which the normally liquid product is withdrawn; a normally gaseous phase, containing the hydrogen to be recycled and combined with the fresh hydrocarbon charge, is withdrawn from the separating means and is passed into the desiccant-containing vessel for the purpose of removing any moisture which may be contained therein. A catalytic reforming process of this type is generally operated with a hydrogen-rich gas stream containing from about 0.1 to about 15.0 grains of hydrogen sulfide per 100 cubic feet, the precise concentration of hydrogen sulfide being carefully controlled in accordance with various considerations which are peculiar to the catalytic reforming process. When utilizing one of the more common, present-day desiccants to reduce the water content of the hydrogen-rich gas stream, the relatively minor quantity of hydrogen sulfide contained therein is also removed. The incongruity of such a result is readily apparent to those possessing skill in the art of catalytic reforming, since the removal of the necessary hydrogen sulfide nullifies, at least in part, the benefits obtained by maintaining a moisture-free reaction zone atmosphere, with the result that catalytic activity and stability are adversely affected.

Another type of process, to which the method of the present invention is applicable, is a process for the hydrorefining, or treating, of various hydrocarbons and mixtures of hydrocarbons. In a hydrorefining process, various contaminating influences contained within a hydrocarbon charge stock, are necessarily removed before the charge stock may be subjected to further processing which would be detrimentally affected by such contaminating influences. In general, the catalytic composite employed in a hydrorefining process comprises metallic components selected from the metals of Group VI-A and the iron-group of the Periodic Table, preferably existing as the sulfides thereof. One such catalyst is molybdenum and nickel and/or cobalt, generally existing as the sulfides on a carrier material consisting essentially of alumina. The catalytic activity and stability of this catalyst is adversely affected by the presence of water within the reaction zone. By the same token, however, it is necessary that the active metallic components be maintained in a sulfided state during the processing. Thus, the method of the present invention, which provides a pre-sulfided desiccant for utilization in the recycled gas stream system, which desiccant will reduce the water content of the recycled gas without removing the hydrogen sulfide therefrom is highly applicable to this type of process. The applicability of a pre-sulfided desiccant to other processes, including hydrogenation, hydrocracking, hydrodealkylation, etc., will become readily apparent to one possessing skill within the art of petroleum processing and being cognizant of the effects exhibited by both water and hydrogen sulfide within the reaction zone. It is understood that utilization of the pre-sulfided desiccant of the present invention is not unduly limited to the processes hereinbefore described. Such processes were given for the sole purpose of illustrating the applicability and utility of the present invention.

*Example*

As hereinbefore set forth, the pre-sulfided desiccant of the present invention affords particular advantages when utilized in a process for the catalytic reforming of hydrocarbons and mixtures of hydrocarbons. This example is given for the purpose of illustrating the method of preparing the pre-sulfided desiccant, and further, to indicate its use in a catalytic reforming process for the purpose of removing moisture from an internally recycled, hydrogen-rich gaseous stream in which a particular concentration of hydrogen sulfide is desired.

A portion of calcium aluminosilicate molecular sieves, having a pore size of about five Angstroms, are placed in an enclosed, elongated vessel, and are maintained at a temperature of about 105° F. through the utilization of ceramic heaters. Since these molecular sieves are intended for use in a system wherein they will be contacted by a gaseous mixture at a temperature of about 80° F. to about 100° F., the sulfiding technique is effected at a slightly higher temperature. A mixture of hydrogen and hydrogen sulfide in a mol ratio of about 3.0:1.0, $H_2S/H_2$, is introduced into the upper portion of the vessel, flowing in a downwardly direction through the molecular sieves, and exiting from the lower extremity of the vessel. The vessel is maintained under a pressure of about 5.0 pounds per square inch to facilitate the flow of gas therethrough. The exit gases from the vessel are continually analyzed for hydrogen sulfide concentration, and, when the concentration of hydrogen sulfide therein is identical to that of the gaseous stream being introduced, the molecular sieves have adsorbed the requisite quantity of hydrogen sulfide. The circulation of the mixture of hydrogen and hydrogen sulfide is stopped, and the molecular sieves are removed from the vessel and placed into service within the recycle gas manifolding of a catalytic reforming process.

The hydrogen-rich gaseous stream is recycled within the reforming process by compressive means, and it is, therefore, convenient to have the recycle gas stream pass through the pre-sulfided desiccant prior to entering the suction side of the compressor. In this particular process, it is desirable to maintain 15.0 grains of hydrogen sulfide per 100 cubic feet of total recycle gas. At the same time, the recycle gas must be maintained substantially completely free from water vapor.

The catalytically active carrier material employed in this example consists of alumina spheres containing combined fluoride in an amount of about 0.35% by weight, which spheres have been calcined at a temperature of about 650° C. The calcined spheres are commingled with an aqueous solution of chloroplatinic acid in an amount sufficient to incorporate 0.750% by weight of platinum therewith. The resulting composite is thereafter subjected to another high-temperature calcination treatment, at a temperature of 500° C., and the finished catalytic composite is divided into two individual portions.

The two catalyst portions are subjected individually and separately to a particular activity-stability test which consists of passing a hydrocarbon feed stock, having a boiling range of about 200° F. to about 400° F., essentially free from sulfurous and nitrogenous compounds, metallic contaminants, and olefinic hydrocarbons, through the catalyst at a liquid hourly space velocity (volumes of hydrocarbon charged per hour per volume of catalyst disposed within the reaction zone) of from about 2.0 to about 3.0, and in an atmosphere of hydrogen present in a mol ratio of hydrogen to liquid hydrocarbons of about 6:1, for a period of 20 hours. The reaction zone is maintained at a temperature of 500° C., and under an imposed pressure of about 500 pounds per square inch. Following the 20-hour period of the test, the zones are cooled and depressured; the individual catalyst portions are removed an analyzed for carbon deposition, an indication of the relative stability of the catalyst. The liquid product collected from each zone, over the entire period of the test, is analyzed for octane rating (F-1 clear).

The catalyst hereinabove described is subjected to the activity-stability test under "dry" conditions. In the first instance, the process is effected by passing the hydrogen-rich recycle gas stream from the high-pressure separator through non-sulfided molecular sieves, and into the compressor. In the second instance, the hydrogen-rich recycle gas stream is passed into contact with the pre-sulfided molecular sieves prior to the suction side of the compressor. In both instances, sufficient tertiary butyl mercaptan is added to the liquid hydrocarbon charge for the purpose of maintaining a concentration of 15.0 grains of hydrogen sulfide within the recycle gas stream entering the reaction zone.

In that instance where the molecular sieve desiccant has not been pre-sulfided, the catalyst indicates a carbon deposition two and one-half times greater than that catalyst utilized under conditions which do not permit the removal of hydrogen sulfide from the recycle gas stream, inherently resulting in a concentration less than 15.0 grains per 100 cubic feet of such recycle gas. Furthermore, the octane rating, F-1 clear of the debutanized liquid product effluent, is approximately 1.0 unit higher than that observed when the concentration of hydrogen sulfide in the recycle gas decreases as the process is being effected.

The significance of the 20-hour test procedure lies in the fact that it exemplifies the initial period of processing, or start-up, of a catalytic reforming process, during which time it is extremely essential to maintain a particular concentration of hydrogen sulfide in the recycle gas coming into contact with the catalytic composite.

The foregoing specification and example clearly illustrate the means by which the pre-sulfided desiccant is prepared, and further illustrates the benefits to be afforded a process for the catalytic reforming of hydrocarbons and mixtures of hydrocarbons.

I claim as my invention:

1. In a process wherein a catalyst is contacted with a substantially dry gas stream containing hydrogen sulfide, said gas stream having been treated with a desiccant to reduce the water content thereof, which desiccant normally effects the removal of hydrogen sulfide therefrom, the improvement which comprises passing said gas stream into contact with a pre-sulfided desiccant to reduce the water content thereof without substantially removing hydrogen sulfide therefrom.

2. The improvement of claim 1 further characterized in that said desiccant comprises alumina.

3. The improvement of claim 1 further characterized in that said desiccant comprises silica.

4. The improvement of claim 1 further characterized in that said desiccant comprises calcium sulfate.

5. The improvement of claim 1 further characterized in that said desiccant comprises sodium aluminosilicate molecular sieves.

6. The improvement of claim 1 further characterized in that said desiccant comprises calcium aluminosilicate molecular sieves.

7. In a hydrocarbon conversion process wherein a catalyst is contacted with a substantially dry hydrogen-rich gas stream containing hydrogen sulfide, said gas stream having been treated with a desiccant to reduce the water content thereof, which desiccant normally effects the removal of hydrogen sulfide therefrom, the improvement which comprises passing said gas stream into contact with a desiccant prepared by saturating said desiccant with hydrogen sulfide, whereby the water content of said gas stream is reduced without substantially removing hydrogen sulfide therefrom.

8. In a hydrocarbon conversion process wherein a catalyst comprising at least one metallic component from Groups VI-A and VIII of the Periodic Table is contacted with a substantially dry hydrogen-rich gas stream containing hydrogen sulfide, said gas stream having been treated with a desiccant to reduce the water content thereof, which desiccant normally effects the removal of hydrogen sulfide therefrom, the improvement which comprises passing said gas stream into contact with a desiccant prepared by saturating said desiccant with hydrogen sulfide, whereby the water content of said hydrogen-rich gas stream is reduced without substantially removing hydrogen sulfide therefrom.

9. A method of preparing a desiccant which comprises saturating said desiccant with a sulfur-containing compound.

10. A method of preparing a desiccant which comprises saturating said desiccant with hydrogen sulfide.

11. The method of claim 10 further characterized in that said desiccant comprises alumina.

12. The method of claim 10 further characterized in that said desiccant comprises silica.

13. The method of claim 10 further characterized in that said desiccant comprises calcium sulfate.

14. The method of claim 10 further characterized in that said desiccant comprises sodium aluminosilicate molecular sieves.

15. The method of claim 10 further characterized in that said desiccant comprises calcium aluminosilicate molecular sieves.

References Cited by the Examiner

UNITED STATES PATENTS

| 2,930,447 | 3/60 | Barrer | 260—676 |
| 3,024,868 | 3/62 | Milton | 260—676 |
| 3,032,495 | 5/62 | Drews | 208—95 |

FOREIGN PATENTS 555,482  4/58  Canada.

OTHER REFERENCES

"Molecular Sieves," R. A. Jones, page 119, vol. IV, Advances in Petroleum Chem. and Refining, Interscience Publishers Inc., New York, 1961.

ALPHONSO D. SULLIVAN, *Primary Examiner.*